March 22, 1960 W. J. HAMPSHIRE 2,929,436
METHOD AND APPARATUS FOR SPRAYING A MIXTURE
OF FIBERS AND RESIN MATERIAL
Filed Oct. 17, 1957 2 Sheets-Sheet 1
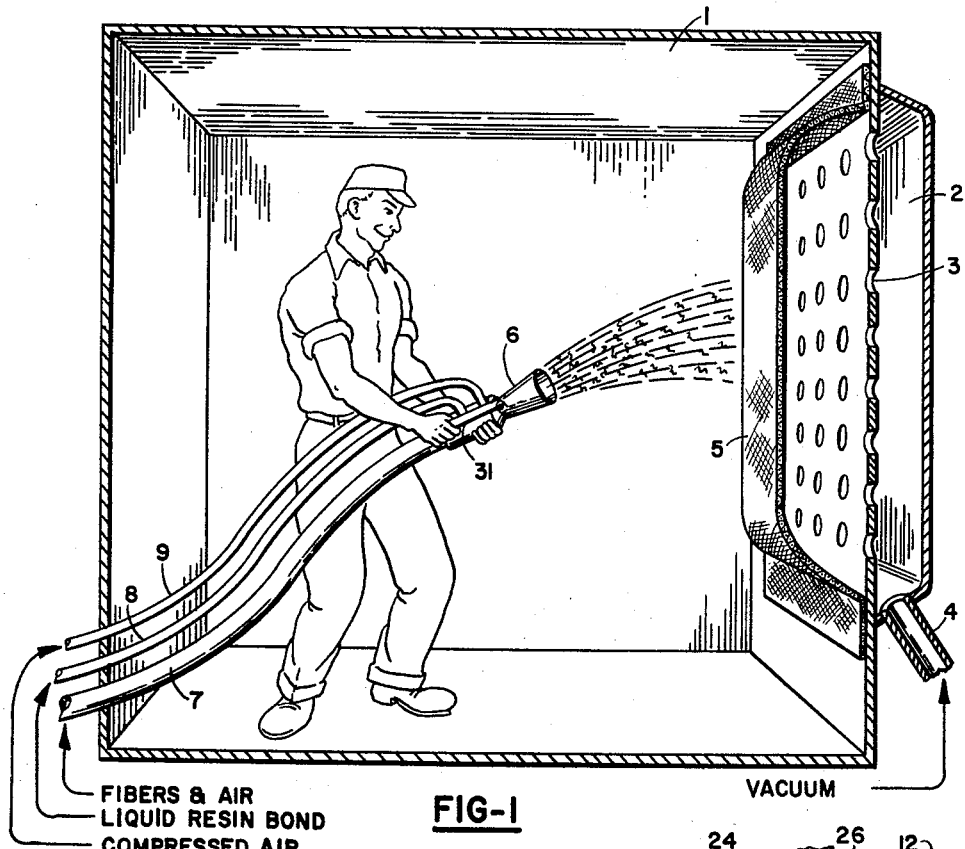
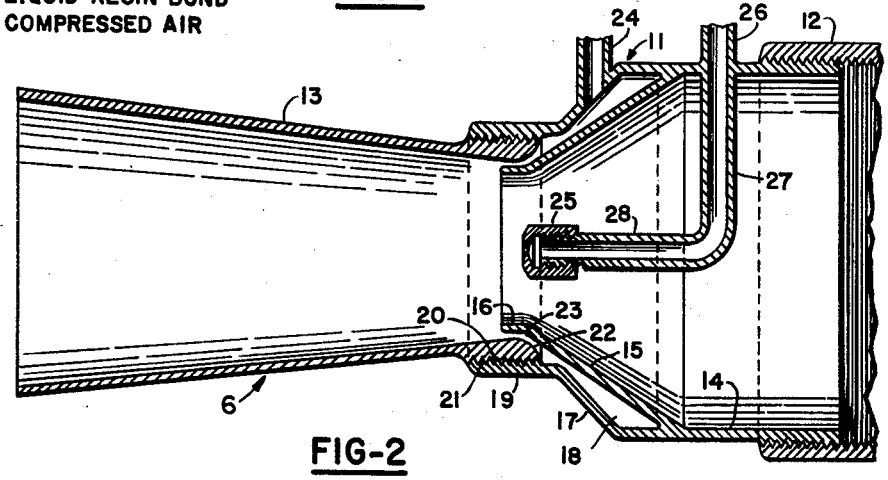
INVENTOR.
WILLIAM J. HAMPSHIRE
BY
*Oldham*
ATTORNEY March 22, 1960

W. J. HAMPSHIRE 2,929,436

METHOD AND APPARATUS FOR SPRAYING A MIXTURE
OF FIBERS AND RESIN MATERIAL

Filed Oct. 17, 1957

INVENTOR.
WILLIAM J. HAMPSHIRE
BY

ATTORNEY

United States Patent Office 2,929,436
Patented Mar. 22, 1960

2,929,436

METHOD AND APPARATUS FOR SPRAYING A MIXTURE OF FIBERS AND RESIN MATERIAL

William J. Hampshire, Cuyahoga Falls, Ohio, assignor to Goodyear Aircraft Corporation, Akron, Ohio, a corporation of Delaware Application October 17, 1957, Serial No. 690,710

8 Claims. (Cl. 154—1)

This invention relates to methods and apparatus for simultaneously spraying fibrous and resinous material to provide a deposit of resin-bonded fibrous material.

In the manufacture of certain articles of plastic reinforced by fibrous material such as glass fibers, it has been found desirable to first provide a semi-formed article of resin-bonded fibers arranged in the approximate form of the desired article and then to mold the semi-formed article together with moldable plastic material to provide the finished article. This method results in a uniform distribution of the strength-giving fibers in the molded article. The semi-formed body of resin-bonded fibers is called a "preform."

Heretofore such preforms have been provided by depositing short lengths of fibrous material on a perforated form such as a form of wire netting by blowing a mixture of the fibers and air against a form of wire netting and providing a low pressure area at the opposite face of the netting. The fibers deposited upon the form have been bonded to each other by spraying resinous bonding material thereon either during or after deposit of the fibers by use of a separate spraying instrumentality. Such separate deposit by spraying of fibers and resinous bonding material has resulted in a non-uniform product as the deposit of fiber might be controlled by one operator and the deposit of bonding material might be controlled by a different operator.

Where it has been attempted to deposit fibers from an airstream and simultaneously to introduce resinous adhesive or other adhesive bonding material to the airstream to bond the fibers to each other, and by introducing the bonding material to the fibers by a common nozzle or similar instrumentality, the material has soon clogged or fouled the nozzle by deposit of fibers and/or bonding material on the walls of the nozzle itself.

The present invention overcomes the foregoing and other difficulties and provides an apparatus relatively free from clogging and fouling and provides a method resulting in a uniform article of fibers and resin.

It is an object of the invention to provide a method of producing uniform preform articles.

Another object of the invention is to provide for simultaneous deposit of fibers and bonding material from one nozzle.

A further object of the invention is to provide against deposit of fibers and bonding material upon the nozzle.

Still another object is to provide a flow of air over surfaces of the nozzle to prevent deposit thereon.

A further object is to provide a layer of air moving at high speed over the inner surfaces of a nozzle to prevent fibers and bonding material from touching such surfaces. These and other objects will appear from the following description, reference being had to the accompanying drawings forming a part thereof.

Of the drawings,

Fig. 1 is a cross sectional view of booth containing a vacuum box, a perforate form thereover for receiving a fibrous deposit and a workman holding a nozzle for depositing fibers and bonding material over the form.

Fig. 2 is an axial sectional view of the nozzle of this invention with the control valves broken away.

Figure 3:
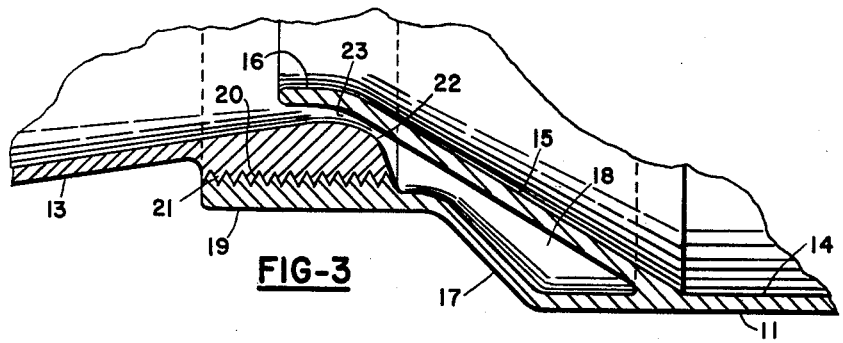
Fig. 3 is an enlarged detail of Fig. 2.

Referring to the drawings, and first to Fig. 1 thereof, the numeral 1 indicates a closed booth having a vacuum chamber 2 secured to one wall thereof. Openings 3 through the wall of the booth connect with the vacuum chamber which in turn is connected to an exhaust line 4 connected to a vacuum pump (not shown). Over the perforated wall area of the wall of the booth is a form 5 of perforate material such as wire netting and formed to the approximate shape of a desired preform article. A nozzle 6 corresponding to this invention, is trained by the operator so as to provide a deposit of fibers and bonding material over the surface of the form 5. It is supplied through flexible conduits extending through a wall of the booth with a mixture of fibers and air by way of a conduit 7, with liquid resin bonding material by way of a hose 8, and with compressed air through hose 9.

The mixture of fibers and air supplied through conduit 7 is achieved in known manner by use of a centrifugal fan and a fiber cutter connected to the conduit outside of the booth 1. An electric on-off switch 10 positioned in association with nozzle 6 and hereinafter described in greater detail, starts and stops the operation of the fan and cutter and the flow of air and fibers through conduit 7.

Usually the resin supplied under pressure through hose 8 takes the form of a mixture of water and water emulsion resin, particularly with respect to the coating of preforms as now being described.

Now referring to Figs. 2 and 3, the nozzle 6 comprises a body member 11 adapted to be attached to the flexible conduit 7 as by collar 12 and a spout member 13 attached adjustably to the body member for axial adjustment. The body member 11 has at its conduit engaging end a larger cylindrical bore 14 which merges into a convergent conical portion 15 terminating in a short cylindrical portion 16 of reduced size. Outside the conical portion 15 and spaced therefrom is a second conical wall 17 fixed to the inner wall at the cylindrical portion of member 11 and providing an annular chamber 18 therebetween. The conical portion 17 terminates in a cylindrical portion 19 having internal threads 20.

The spout member 13 has threads 21 which engage within threads 20. The spout member is of divergent conical shape and its conical bore is slightly larger at the threaded end thereof than the outer diameter of the portion 16 of the body member. The spout member has its bore flared at the smaller end outwardly in a smoothly curved surface 22. The arrangement is such that the flared end of the spout member may be adjusted toward and from the outer conical surface of the portion 15 of the body member by relative rotational adjustment of the members and the annular throat 23 between the members forms a venturi-like outlet between the members from the chamber 18. Thus, the size of the throat 23 can be adjusted and the speed and pressure of air through the throat controlled.

A conduit 24 projects from the body member and connects with the chamber 18 to deliver air under pressure thereto. A spray nozzle 25 is located at the axis of the nozzle at or near the cylindrical delivery portion 16 of the body member for delivering a spray of bonding material axially of the spout member. An L-shaped pipe 26 is secured through the body member with one leg 27 radial thereof and the other leg 28 axial thereof, the end of leg 28 being threaded to removably receive the spray nozzle 25.

The arrangement is such that the spray nozzle 25 is located at the smallest diameter of the throat of the nozzle and the nozzle members 11 and 13 together define a venturi passage through which a mixture of short fibers and air is blown. In accord with known venturi action, the relatively slow-moving body of air and fibers in conduit 7 and of relatively large diameter, as the venturi nozzle of reduced diameter is reached the speed of the body of air and fibers is materially increased. As the fibers pass through the spout member 13 of the nozzle, they are sprayed with adhesive bonding material by the nozzle 25. The liquid bonding material is conveyed under pressure to a control valve 29 through the hose 8. The operator controls valve 29 to supply the proper or desired amount of bonding material to nozzle 25. A control valve 30 is provided to control air under pressure from hose 9 to chamber 18.

Figure 4:
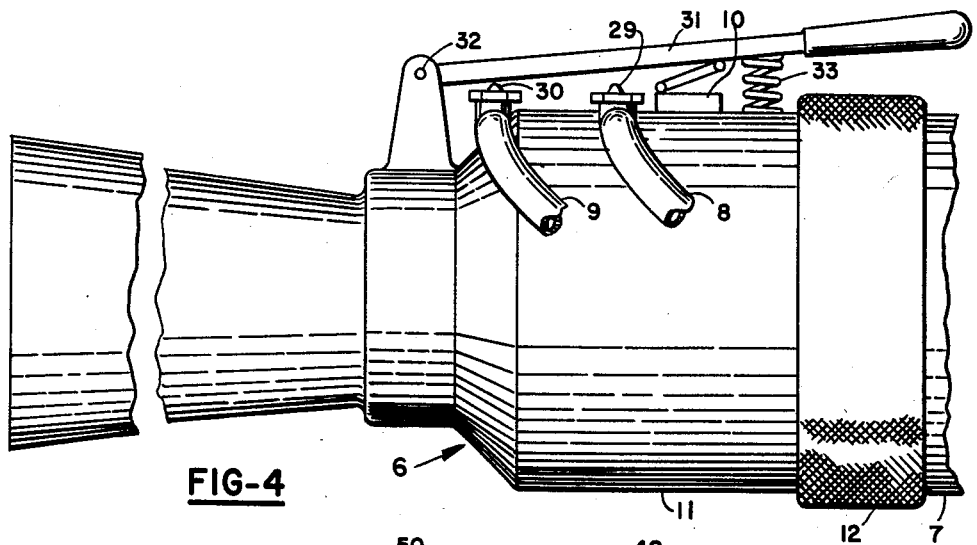
Fig. 4 is a side elevation of control details on the nozzle.

Fig. 4 shows a typical control for the nozzle 6. More specifically, a control handle 31 is pivoted at 32 on body member 11 and is held in an outward position by compression spring 33. The control handle 31 upon inward movement by the operator engages first with valve 30 to open the air flow to chamber 18 so that a protective shell of high speed air is established out of opening 23 and over the inner surface of spout member 13. This flow of air also induces flow of air, resin and fiber through the nozzle with a venturi action as will be understood. Further movement of handle 31 then closes switch 10 to turn on the fan and cutter connected to conduit 7. Continued inward movement of handle 31 opens valve 29 which discharges the resinous bonding material from nozzle 25.

It should be appreciated that an important feature of the invention is to provide the film of air under high pressure and at high speed which is projected along the inner face of the conical second member where it acts as a blanket of air preventing the fibers and adhesive bonding material from depositing upon the walls of the nozzle. The mixture of fibers and bonding material with air under lower pressure is blown through this annular protective blanket of high speed air and is deposited upon the form 5 beyond the end of the nozzle. As aforesaid, the cone or blanket of high speed air passing out opening 23 induces with venturi action the flow of air, resin and fibers through the nozzle and towards the form 5.

Figure 5:
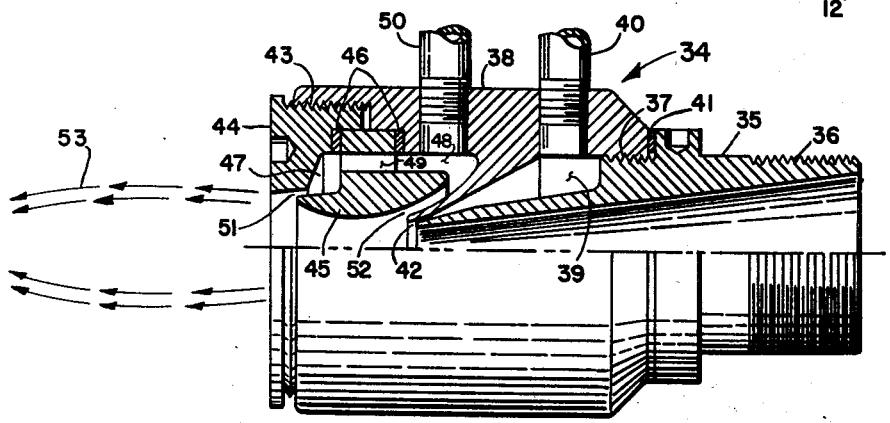
Fig. 5 is a view similar to Fig. 2 but illustrating a modification of the invention.

The nozzle embodiment shown in Fig. 5 is adapted to directly spray molding resin plus fibers, glass or otherwise, on or in a shape immediately followed by final molding. In other words, the step of making a preform is eliminated. The nozzle of Fig. 5 has in common with the nozzle of Figs. 1 to 4 the important inventive concept of providing a blanket or layer of high speed air over the inner wall of the nozzle to prevent the deposition of any resin thereon.

More particularly considering Fig. 5 the numeral 34 indicates generally the nozzle formed of a body member 35 threaded at one end 36 so that it can be secured to a conduit like conduit 7 carrying air and fibers. Threadably secured, as at 37, to the body member 35 is a collar 38, and with the collar and body member 35 being formed with complementary portions defining cavity 39 having a conduit 40 connected thereto and extending to a supply of resin under pressure. One or more shims 41 positioned between body member 35 and collar 38 controls the size of the opening 42 and the flow of resin to the bore of the nozzle.

The collar 38 threadably received, as at 43, a lock ring 44 which adjustably clamps a venturi ring 45 in position. One or more shims 46 controls the position of the venturi ring 45, and the size of cavities 47 and 48 formed by complementary portions of collar 38, lock ring 44 and venturi ring 45. The cavities 47 and 48 are connected to each other by passages 49 to a conduit 50 extending to a source of air under pressure. Thus, air is discharged through openings 51 and 52 in the use of the apparatus.

Usually the air discharged from opening 51 provides a directional stream tube of air substantially as indicated by numeral 53. The air discharged from opening 52 expands through the venturi ring 45 creating a moderate vacuum which induces the laminar flow of air into the end of conduit 7, thus carrying fibers from the cutter.

It should be understood that by laminar flow is meant the non-tumbling flow of fibers in positions substantially parallel to the axis of the discharge nozzle and conduit 7. This helps the uniformity, orientation and interlocking of the fibers on the mold, keeps the diameter of the discharge nozzle and conduit 7 to a minimum, and permits the use of a minimum amount of discharge air.

Thus it will be seen that the objects of the invention have been accomplished and that an apparatus has been provided whereby fibers suspended in air may be blown through a nozzle for deposit upon a surface at the control of the operator and simultaneously the fibers may be sprayed with plastic or other adhesive bonding material from the same nozzle without deposit of the fibers or plastic upon the nozzle.

While certain representative embodiments and details have been shown for the purpose of illustrating the invention, it will be apparent to those skilled in this art that various changes and modifications may be made therein without departing from the spirit or scope of the invention.

What is claimed is:

1. The method of spraying a mixture of fibers and bonding material which comprises introducing a relatively large diameter, slow moving body of a mixture of air and fibers through a venturi passage of a nozzle to thereby reduce the diameter and increase the speed of the body of the mixture, providing a spray of bonding material at the throat of the venturi passage in the direction of flow of the air and fiber mixture to deposit bonding material upon the fibers, and providing a completely conical flow of air at a still higher velocity along the surfaces of the venturi passage in the direction of flow of the fibers to prevent deposit of fibers and bonding material upon the surfaces of the nozzle down stream from the venturi passage.

2. The method of spraying a mixture of fibers and resin bonding material which comprises introducing a relatively large diameter stream of air and suspended fibers axially through a venturi passage of a nozzle to reduce the diameter and increase the speed thereof, providing a spray of resinous bonding material in liquid form at a throat of the venturi passage in the direction of flow of the air and fiber stream to deposit bonding material upon the fibers as they are carried through the nozzle by the stream, and providing a blanketing flow of air at a higher velocity than the stream of air fibers and bonding material around said stream and along the surfaces of the passage to prevent deposit of fibers and bonding material upon said surfaces.

3. The method of spraying a mixture of fibers and resinous bonding material which comprises passing a large diameter stream of air with fibers suspended therein through a venturi passage of a nozzle to reduce the diameter of the stream and increase its speed, introducing a liquid resinous bonding material to a position at the narrow throat of the venturi passage and there spraying it upon the fibers in the direction of their travel, and introducing a surrounding completely conical blanket of air at high velocity at said throat and flowing along the surfaces of the passage from said throat to the delivery end of the nozzle to prevent deposit of fibers and bonding material upon the surfaces of the nozzle and to additionally speed up the stream of air and suspended fibers through the nozzle with laminar flow.

4. Apparatus for spraying a mixture of fibers and bonding material, said apparatus comprising a nozzle having a venturi passage therethrough, means for conducting a relatively large diameter stream of air and suspended fibers to said venturi passage and centrally thereof, means in said nozzle at the venturi passage adapted to direct a spray of bonding material axially of said passage in the direction of flow of said stream, and means for providing a completely conical blanketing flow of air at high velocity over the surfaces of said venturi passage from said throat to the delivery end of said nozzle to prevent the deposit of fibers and bonding material thereon and to induce a still faster flow of air and suspended fibers through the nozzle.

5. Apparatus for spraying a mixture of fibers and resinous bonding material, said apparatus comprising a nozzle formed of a plurality of members and having a venturi passage therethrough, means for conducting a stream of air and suspended fibers of larger diameter than the venturi passage to said passage, a spray head in the venturi passage and adapted to direct a spray of resinous bonding material in said passage in the direction of flow of said stream, and means for providing a blanketing flow of air at high velocity over the surfaces of said venturi passage from the smallest diameter thereof towards the delivery end of said nozzle to prevent the deposit of fibers and bonding material thereon, said last named means comprising an annular jet passage provided between consecutive nozzle members defining said smallest diameter and directed in the direction of the stream, and means for adjusting one of said nozzle members axially of the venturi passage to adjust said annular jet passage.

6. Apparatus for spraying a mixture of fibers and resinous bonding material, said apparatus comprising a nozzle having a venturi passage axially therethrough for conducting a stream of fibers and compressed air, said nozzle including a first nozzle member of convergent conical shape having its larger end adapted to be secured to a flexible conduit, and a second nozzle member of divergent conical shape having its smaller end externally threaded to adjustably secure it to the first nozzle member, said first nozzle member having a conical delivery portion adapted to enter the smaller end of the second nozzle member and having a conical jacket thereabout and internally threaded to receive said second nozzle member, said jacket and said conical delivery portion defining therebetween an annular chamber, a compressed air connection for delivering air under pressure to said annular chamber, and a flared margin at the smaller end of said second nozzle member and defining with the conical delivery portion of said first nozzle member an annular constricted passage of adjustable width for delivering a blanket of compressed air at high velocity along the surfaces of said second nozzle member, and means providing a spray of resinous bonding material at the delivery portion of said first nozzle member axially of the venturi passage through said members for spraying resinous bonding material upon the fibers.

7. Apparatus for spraying a mixture of fibers and resinous bonding material, said apparatus comprising a nozzle having a venturi passage axially therethrough for conducting a stream of fibers and compressed air, said nozzle including a first nozzle member of convergent conical shape having its larger end adapted to be secured to a flexible conduit, and a second nozzle member of divergent conical shape having its smaller end externally threaded to adjustably secure it to the first nozzle member, said first nozzle member having a conical delivery portion adapted to enter the smaller end of the second nozzle member and having a conical jacket thereabout and internally threaded to receive said second nozzle member, said jacket and said conical delivery portion defining therebetween an annular chamber, a compressed air connection for delivering air under pressure to said annular chamber, and a flared margin at the smaller end of said second nozzle member and defining with the conical delivery portion of said first nozzle member an annular constricted passage of adjustable width for delivering a blanket of compressed air at high velocity along the surfaces of said second nozzle member, and means providing a spray of resinous bonding material at the delivery portion of said first nozzle member axially of the venturi passage through said members for spraying resinous bonding material upon the fibers, said last named means comprising a spray head directed axially outward of said first nozzle member and mounted on a supply pipe extending through the body of said first nozzle member.

8. Apparatus for spraying a mixture of fibers and resinous bonding material, said apparatus comprising a first nozzle member and a second nozzle member together defining a nozzle passage therethrough for delivery of a mixture of fibers and compressed air from a flexible supply conduit, said first nozzle member comprising a cylindrical attaching portion for securing it to a conduit, a funnel-like convergent conical portion, an internally threaded sleeve surrounding the convergent portion for engaging the second nozzle member and defining an annular chamber between the convergent conical portion and the sleeve, compressed air connection to said chamber, a jet located axially of said first nozzle member at its outlet for spraying a resinous material, said nozzle member being supported by and supplied through the wall of said first nozzle member, and said second nozzle member having a divergent conical wall, said wall being threaded at its small end to engage said first nozzle member and having a smooth rounded throat for defining with the first nozzle member an adjustable annular jet passage for feeding air under pressure along the wall of said second nozzle member to prevent deposit of fibers and resinous material thereon.

References Cited in the file of this patent

UNITED STATES PATENTS

| | | |
|---|---|---|
| 1,718,507 | Wenzel et al. | June 25, 1929 |
| 1,725,608 | Zebulske | Aug. 20, 1929 |
| 1,978,125 | Bennett | Oct. 23, 1934 |
| 2,478,557 | Bell et al. | Aug. 9, 1949 |
| 2,787,314 | Anderson | Apr. 2, 1957 |
| 2,788,719 | Bennett | Apr. 16, 1957 |
| 2,810,426 | Till et al. | Oct. 22, 1957 |